Patented Feb. 9, 1926.

1,572,359

UNITED STATES PATENT OFFICE.

HOWARD S. PAINE, OF CHEVY CHASE, MARYLAND, CHARLES F. WALTON, JR., OF WASHINGTON, DISTRICT OF COLUMBIA, AND VICTOR BIRCKNER, OF OXON HILL, MARYLAND, DEDICATED, BY MESNE ASSIGNMENTS, TO THE CITIZENS OF THE UNITED STATES OF AMERICA.

METHOD OF CANE-SUGAR PRODUCTION.

No Drawing.    Application filed February 8, 1924. Serial No. 691,468.

(GRANTED UNDER THE ACT OF MARCH 3, 1883; 22 STAT. L. 625.)

*To all whom it may concern:*

Be it known that we, HOWARD S. PAINE, CHARLES F. WALTON, Jr., and VICTOR BIRCKNER, citizens of the United States of America, and employees of the Department of Agriculture of the United States, residing at Chevy Chase, Maryland, Washington, District of Columbia, and Oxon Hill, Maryland, respectively, have jointly invented new and useful Methods of Cane-Sugar Production.

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to us of any royalty thereon.

Our invention relates particularly to the desugarization of cane molasses, and applies also to the recovery of sucrose from other products containing sucrose together with other sugars. Desugarization of beet molasses has long been an established commercial practice, but when the same procedures have been applied to exhausted sugar cane molasses, that is, cane molasses from which all sucrose possible has been recovered by direct crystallization, the results have not been sufficiently satisfactory to justify the adoption of the process on a commercial scale. The difference in results obtained when working with beet molasses, and those found when applying the same methods to cane molasses, seems to be attributable to their difference in composition. Beet molasses contains practically no dextrose and levulose, whereas exhausted cane molasses does contain a large percentage of these sugars. Very good evidence has been obtained that dextrose and levulose, and also the decomposition products of these sugars, interfere with the production of saccharate of suitable composition when attempting to desugarize sugar cane molasses.

It has been known for some time that by selective fermentation of such sugars as dextrose and levulose, making use of microorganisms substantially free from invertase, for example those of the pseudosaccharomyces apiculatus group, sugars that are fermentable without the aid of invertase, for example dextrose and levulose, can be decomposed and thereby eliminated from sugar cane molasses, leaving the sucrose practically intact. It was first proposed (U. S. Patent 751,990) to make use of this principle of selective fermentation to remove dextrose and levulose, employing members of the pseudosaccharomyces apiculatus group, and following the completion of the fermentation to concentrate the fermented liquor containing sucrose in a vacuum pan according to the customary sugar-house practice to obtain sucrose by direct crystallization.

More recently an attempt has been made (U. S. Patent 1,401,433) to combine the idea of selective fermentation of dextrose and levulose with a modification of the saccharate process as ordinarily applied to the desugarization of beet molasses.

We have found that it is not necessary to make use of any ethyl alcohol in connection with the saccharate process as applied to the liquor resulting from the selective fermentation of sugar cane molasses. Ethyl alcohol is produced during fermentation, but this may be recovered before the application of the saccharate process, if desired, or it is possible to first make the saccharate and subsequently recover the products of fermentation. At all events, it is not necessary to may use of added ethyl alcohol in the manner recommended.

In our process we have employed suitable members of the pseudosaccharomyces apiculatus group which are substantially free from invertase, and have fermented the dextrose and levulose, leaving the sucrose virtually intact. After the fermentation has been completed, we have been successful in preparing saccharate of suitable quality without the necessity for using any added amount of ethyl alcohol. We have been successful in applying the well-known and established Steffen process for the formation of saccharate of lime, without substantial modifications. It follows, therefore, that the saccharates of barium, lead, strontium, or of any other suitable metallic base, could probably be similarly manufactured successfully, provided the saccharate process be modified accordingly.

Following the manufacture of saccharate of lime in our process, the saccharate is decomposed by carbon dioxide and the calcium carbonate separated from the sugar liquor, which is then evaporated in a vacuum pan in the customary manner to obtain sucrose by crystallization. This procedure does not differ from well-known industrial practice as applied in the recovery of sucrose from beet molasses, and is not claimed as a part of our invention.

The selective fermentation of dextrose and levulose produces ethyl alcohol, which in our process may be recovered either before or after the precipitation of saccharate. The best results have been obtained when saccharate has been made first and the ethyl alcohol recovered subsequently.

The following details of our process are given as an example of the procedure developed, although the conditions of time, temperature, density and quantity of liquors and reagents, etc., may be varied in the application of our process to meet varying commercial conditions.

The molasses is diluted to a density of 18° Brix and subjected to pure culture selective fermentation of invert sugar by suitable members of the "S. apiculatus" group. At the end of the fermentation period, the length of which will depend upon the size and vigor of the starter employed as well as on other conditions, but which has been found to require approximately 4 days, the invert sugar is very nearly completely fermented without substantial loss of sucrose, the ratio of invert sugar to sucrose after fermentation being approximately 1 to 6.5. The sucrose content of the fermented liquor is about 5 per cent, which is considered a satisfactory concentration, without either dilution or evaporation, for the next stage in the process, which is the production of calcium saccharate.

Employing an experimental Steffen cooler of the same design as is commonly used on a large scale in the beet sugar industry, a charge of 14 liters of the fermented liquor containing 5 per cent sucrose was taken. After cooling to a temperature of 10° C. powdered lime (CaO) was added in the proportion of 1½ lime to 1 sucrose, the lime being slowly and automatically added over a period of fifteen minutes. The cold saccharate cake resulting after filtration was washed with ten liters of water at a temperature of 15° C. and dried by vacuum. The cake was then suspended in water to a density of about 35° Brix, heated to 85° C. and carbonated to neutrality to phenolphthalein. The precipitated calcium carbonate was subsequently washed with a minimum of hot water to reduce its sucrose content to roughly 0.5 per cent. The products of the initial fermentation now contained in the combined filtrate, or waste, and the wash from the cold saccharate filtration were next obtained by distillation. Finally the residue was heated to a temperature of 85° C. for fifteen minutes to produce the maximum yield of hot saccharate, which was then filtered off and washed with a minimum of hot water to reduce the impurities contained therein without substantial loss of sucrose. If sufficient heat has been applied during distillation, the hot saccharate is ready for filtration without additional heat treatment.

In a cycle of five experiments, making saccharate as above described, a certain proportion of the hot saccharate resulting from the first experiment in the cycle was used to make a preliminary clarification of the fermented liquor to be subjected to the cold saccharate operation for the second experiment in the cycle, and similarly a proportion of the hot saccharate from the second experiment was employed to clarify the liquor prepared for the third experiment in the cycle, etc. The quantity of hot saccharate employed for this purpose was equivalent to 5 per cent of powdered lime (CaO) based on the sucrose content of the fermented liquor. The remainder of the hot saccharate was added directly to the cooler, where it was combined with the clarified liquor, this procedure being systematically followed throughout the cycle of the five experiments. The average of the true purities (ratio of sucrose to total solids) of the five cold saccharate liquors was 80.6. The average Brix was 8.0° and the total recovery of sucrose 76.96 per cent.

We claim:

1. The process of recovering sucrose from molasses, which consists of the removal of the invert sugar contained in the molasses, by selective fermentation, the precipitation of the residual sucrose as saccharate, the decomposition of the saccharate to obtain sucrose in solution, filtration of the sucrose solution and the subsequent crystallization of sucrose.

2. The process of recovering sucrose from molasses, which consists of the removal of the invert sugar contained in the molasses by selective fermentation, the precipitation of the residual sucrose as saccharate by the addition of lime, the decomposition of the calcium saccharate by the use of carbon dioxide to obtain sucrose in solution, filtration of the sucrose solution to remove the carbonate of lime, and the subsequent crystallization of sucrose.

HOWARD S. PAINE.
CHARLES F. WALTON, Jr.
VICTOR BIRCKNER.